United States Patent [19]

Sanders et al.

[11] Patent Number: 4,868,456

[45] Date of Patent: Sep. 19, 1989

[54] CAPPED ELECTRIC LAMP HAVING A BUSHING-SLEEVE ARRANGEMENT PERMITTING ALIGNMENT OF THE LAMP VESSEL WITH THE LAMP CAP

[75] Inventors: Rudolf Sanders; Johannes A.A.M. Van Heeswijk, both of Eindhoven, Netherlands

[73] Assignee: U.S. Philips Corporation, New York, N.Y.

[21] Appl. No.: 249,025

[22] Filed: Sep. 22, 1988

[30] Foreign Application Priority Data

May 24, 1987 [NL] Netherlands ........................ 8801326
Sep. 24, 1987 [NL] Netherlands ........................ 8702273

[51] Int. Cl.$^4$ ........................ H01J 5/60; H01G 5/14

[52] U.S. Cl. ........................ 313/623; 313/318; 313/51

[58] Field of Search ................ 313/623, 624, 318, 51; 362/296, 297

[56] References Cited

U.S. PATENT DOCUMENTS

| | | | |
|---|---|---|---|
| 4,012,658 | 3/1977 | Vause | 313/318 |
| 4,641,056 | 2/1987 | Sanders et al. | 313/51 |
| 4,687,965 | 8/1987 | Sanders et al. | 313/318 |
| 4,714,858 | 12/1987 | Sanders | 313/318 |

*Primary Examiner*—Donald J. Yusko
*Assistant Examiner*—Sandra L. O'Shea
*Attorney, Agent, or Firm*—Brian J. Wieghaus

[57] ABSTRACT

The capped electric lamp has a metal clamping member which surrounds a longitudinal part of the lamp vessel with a clamping fit and is secured to a metal bushing. The lamp cap has a metal sleeve secured therein which receives the metal bushing with telescoping fit to allow alignment of the lamp vessel with the lamp cap. After alignment, the metal bushing is fixed to the sleeve, for example, by welding. A dimming hood is secured in the aligned state to the bushing. A current-supply conductor extends through a tubular part inside of the lamp cap to a contact member of the lamp cap.

20 Claims, 2 Drawing Sheets

CAPPED ELECTRIC LAMP HAVING A BUSHING-SLEEVE ARRANGEMENT PERMITTING ALIGNMENT OF THE LAMP VESSEL WITH THE LAMP CAP

BACKGROUND OF THE INVENTION

The invention relates to a capped electric lamp of the type having a translucent lamp vessel sealed in a vacuum-tight manner, filled with gas and having a longitudinal axis in which an electric element is arranged, current supply conductors extending from the electric element through the lamp vessel to the exterior. A metal clamping member surrounds with clamping fit a longitudinal part of the lamp vessel. The lamp has a lamp cap of insulating material provided with a cup-shaped part with a continuous wall portion and a base portion and having contact members projecting beyond the cup-shaped part. A substantially circular-cylindrical metal sleeve is fixed in the cup-shaped part of the lamp cap and has an end projecting beyond said part by. The metal clamping member connected to the metal sleeve and the current supply conductors are connected to a respective contact member of the lamp cap.

Such a capped electric lamp is known from EP O 193 997-A1 which corresponds to U.S. Pat. No. 4,687,965. The known lamp is intended to be used as a vehicle headlight lamp.

The said Application discloses an electric lamp, in which the electric element is a transversely arranged filament. The lamp vessel is therefore fairly broad and the seal of the lamp vessel is fairly wide. Through this seal, two or more current supply conductors are passed to the exterior. The known incandescent lamp is therefore very suitable to be used with a metal clamping member consisting of a plate provided with an opening, in which the lamp vessel is held by vanes formed at said plate along said opening. The plate has a cylindrical flanged edge, which is welded to the metal sleeve.

In an electric lamp having a comparatively narrow lamp vessel, such as, for example, the electric discharge lamp according to GB No. 2 132 011 B which corresponds to U.S. Pat. No. 4,594,529, the lamp vessel does not provide for sufficient grip for the known plate-shaped clamping member to be secured to the lamp cap by means thereof.

For electric lamps used in an optical system, such as vehicle headlights, however, it is of great importance that the electric element occupies an accurately defined position with respect to the lamp cap so that with a defined positioning of the lamp cap with respect to a headlight reflector the electric element occupies the correct position in this reflector. This is necessary to obtain a good light beam from such a headlight, which is not dazzling.

EP 0224 954 A1 which corresponds to U.S. application Ser. No. 932,955 filed Nov. 19, 1986, discloses a capped vehicle headlight lamp, in which the comparatively narrow lamp vessel is secured by its current supply conductors electrically, but also mechanically, to conductors arranged in the lamp cap. In case the current supply conductors are comparatively thin and hence are mechanically weak, it is objectionable to secure the lamp vessel also mechanically to the lamp cap only by means of said current-supply conductors.

In this known vehicle headlight lamp, it is further not always possible to secure the lamp vessel in a sufficiently aligned state to the lamp cap, for example if the electric element is not wholly concentrically arranged in the lamp vessel.

SUMMARY OF THE INVENTION

The invention has for its object to provide an electric lamp of the kind described in the opening paragraph, which has a simple and rigid fixation of the lamp vessel to the lamp cap and which can readily be manufactured. The invention further has for its object to provide such a lamp provided with a dimming hood having a construction which can readily be mounted.

According to the invention, this object is achieved in a lamp of the kind mentioned in the opening paragraph in that a metal bushing is provided having a base part and a mainly circular-cylindrical part, said base part having an opening into which the lamp vessel is passed, the metal clamping member being secured to the metal bushing and the metal bushing cooperating telescopically with the metal sleeve in the lamp cap and being secured thereto.

The connections: clamping member/metal bushing, metal bushing/metal sleeve in the lamp cap may be soldering connections and/or welding connections, for example resistance welds. Before the last-mentioned connections are established, the electric element is aligned with respect to the lamp cap. This electric element may be a pair of electrodes arranged along the longitudinal axis of the lamp vessel or a longitudinally arranged filament. The current-supply conductors generally emanate from the lamp vessel opposite to each other along the longitudinal axis. For example in an incandescent lamp, they may alternatively extend to the exterior beside each other, however.

The longitudinal part of the lamp vessel engaged by the metal clamping member may have various shapes. It may have, for example, a circular, an oval or a rectangular cross-section. The relevant part may be a seal of the lamp vessel, in which the current supply conductor is enclosed in a vacuum-tight manner, but alternatively it may be a non-deformed tubular part of a lamp vessel portion, in which a seal of the lamp vessel is formed.

The metal clamping member may be, for example, a muff.

A favorable embodiment of the lamp according to the invention is characterized in that the metal clamping member is a tube having a protruding collar, said tube having a longitudinal gap merging into a radial gap in the collar, the protruding collar being secured to the base part of the metal bushing.

In this embodiment, the tube of the metal clamping member surrounds with clamping fit a longitudinal part of the lamp vessel through the gap provided in said tube and in its protruding collar. The clamping member may be arranged at a predetermined area. By the choice of the length of the tube, the strength of the coupling between the clamping member and the lamp vessel can be adapted to the mass of the lamp vessel. A tube length of several millimeters, for example 4 to 10 mms, is generally sufficient.

The clamping member and the bushing may be arranged in line with each other, but alternatively the clamping member may be arranged within the bushing, the collar of the clamping member, for example, being directed towards the electric element and being secured on the outer side of the bushing. This geometry can be very readily realized. The connections can then be established on the outer side of the bushing.

A further favorable embodiment of the lamp according to the invention is characterized in that the metal clamping member is a muff consisting of two parts of Z-shaped cross-section each having a central surface and two end surfaces at least substantially at right angles thereto, the central surfaces of said parts being arranged opposite to each other and the end surfaces engaging each other pairwise at least over part of their surface area and being secured to each other in situ.

This muff construction has the advantage compared with a muff in one piece that the extent of fixation of the lamp vessel by the muff is only slightly dependent upon the accuracy of size of the muff and the lamp vessel.

In a favorable variation, the central surface of the parts of the muff is underdimensioned. When securing the end surfaces of the muff parts pairwise to each other while the central surfaces are constantly pressed against the lamp vessel, a clamping effect of the relevant end surfaces on the lamp vessel is obtained. Of the finished muff, both the central surfaces and the end surfaces of the Z-shaped muff parts limiting the space within the muff are in contact with the longitudinal part of the lamp vessel. This longitudinal part can then be displaced neither in axial directions nor in transversal directions with respect to the surrounding muff.

The muff can be secured to the metal bushing by means of metal strips. The metal strips can be secured to the base portion of the metal bushing on the inner or outer side thereof. Alternatively, the metal strips may be secured to the circular-cylindrical portion of the metal bushing, for example on the inner side thereof. The metal strips may be integral with the muff.

In the embodiment of the lamp according to the invention, the lamp is intended to form a dipped beam. In this embodiment, the lamp vessel may be surrounded laterally over part of its circumference by a dimming hood. In a favorable embodiment, the dimming hood has at one end a cylindrical part provided with longitudinal metal tongues arranged in spaced relationship. After the dimming hood has been aligned with respect to the light source in the lamp vessel, the tongues are secured to the said metal bushing, to which the clamping member is also secured. The assembly of lamp vessel, clamping member, metal bushing and dimming hood can then be united with the lamp cap after the electric element has been aligned.

The dimming hood can be connected to a current supply conductor of the lamp and can be current-conveying during operation. A contact member of the lamp cap can be connected in this embodiment to the metal sleeve in the lamp cap.

In a favorable embodiment, the lamp cap has within the cup-shaped part a tubular part arranged at right angles to the base portion. The tubular part can be tightly surrounded by the metal sleeve. A current supply conductor extends through said tubular part to a contact member of the lamp cap. The tubular part can center the metal sleeve and isolates the latter from said current supply conductor, which is useful for the use in lamps operated or ignited at a high voltage.

The lamp cap can have a protruding collar to cooperate with the boundary of an opening in a reflector. Said collar can have a continuous groove for receiving, for example, a ring of rubber to seal the lamp cap onto such a reflector. It has proved to be favorable to arrange said collar near the open end of the cup-shaped part of the lamp cap because a comparatively small light center length, for example of 25 mm, can thus be obtained.

The contact members of the lamp cap may extend in the direction of the longitudinal axis of the lamp vessel, but may alternatively extend at right angles thereto. The capped lamp may have a smaller length in the latter case.

BRIEF DESCRIPTION OF THE DRAWINGS

An embodiment of the lamp according to the invention and embodiments of intermediate products of the lamp according to the invention are shown in the drawings. In the drawings.

DETAILED DESCRIPTION OF THE PREFERRED EMBODIMENTS

Figure 1:
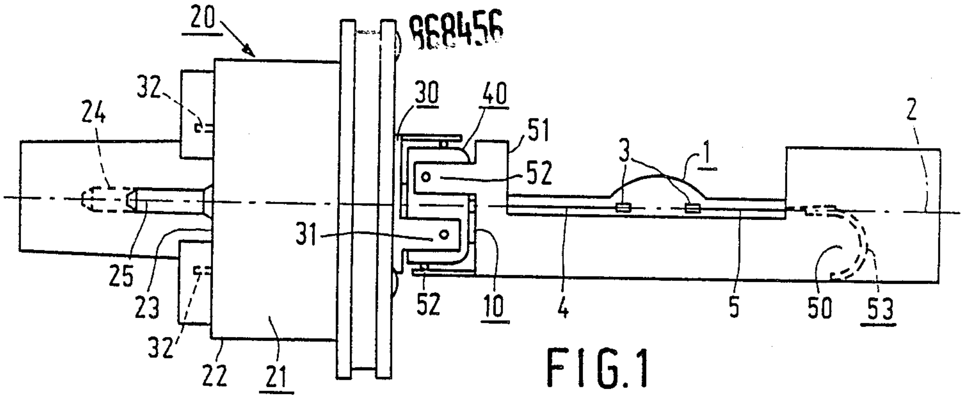
FIG. 1 is a side elevation of an embodiment of the lamp.

FIG. 1 shows a capped electric lamp comprising a translucent lamp vessel 1, which is sealed in a vacuum-tight manner, is filled with gas and has a longitudinal axis 2. An electric element 3 is arranged in the lamp vessel 1 and is constituted in the Figure by a pair of electrodes arranged along the longitudinal axis 2. Current supply conductors 4, 5 extend from the electric element 3 through the wall of the lamp vessel 1 to the exterior, in the Figure opposite to each other and along the longitudinal axis 2.

A metal clamping member 10 surrounds a longitudinal part of the lamp vessel 1 with clamping fit.

The lamp cap 20 of insulating material, for example synthetic material, such as polyether imide or ceramic material, has a cup-shaped part 21 comprising a continuous wall portion 22 and a base portion 23. Contact members 24, 25 project from the cup-shaped part 21.

A substantially circular-cylindrical metal sleeve 30 is fixed in the cup-shaped part 21 of the lamp cap 20 and projects by one end 31 from said part 21. The metal clamping member 10 is connected to the metal sleeve 30 and the current supply conductors 4, 5 are connected to a respective contact member 24, 25 of the lamp cap 20.

Figure 2:
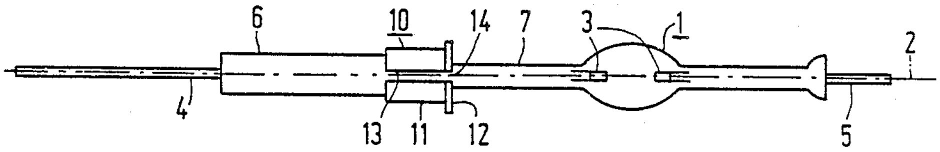
FIG. 2 is a side elevation of an intermediate product of the manufacture of the lamp of FIG. 1.
Figure 3:
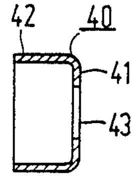
FIG. 3 is a longitudinal sectional view of the metal bushing of the lamp of FIG. 1.

Simultaneously, reference is made to FIGS. 1, 2 and 3. The metal clamping member 10 is secured to the metal bushing 40 comprising a base part 41 provided with an opening 43 into which the lamp vessel 1 is passed and a substantially circular-cylindrical part 42. The metal bushing 40 cooperates telescopically with the metal sleeve 30 and is secured thereto by welds at the end 31 of the sleeve 30. The end 31 of said sleeve 30 consists of a number of longitudinal tongues. Before the bushing 40 was secured to the sleeve 30, the lamp vessel 1 was aligned by translation and rotation with respect to the lamp cap 20. The metal clamping member 10 is a tube 11 with a protruding collar 12, the tube 11 having a longitudinal gap 13 merging into a radial gap 14 in the collar 12. The protruding collar 12 of the clamping member 10 is secured by welding to the base part 41 of the metal bushing 40. In FIG. 1, the tube 11 of the clamping member 10 is located within the metal bushing 40 due to the fact that the clamping member 10 is passed together with the lamp vessel 1 into the opening 43. The collar 12 of the clamping member 10 is directed towards the electric element 3 and is secured on the outer side of the metal bushing 40 in the embodiment shown. The clamping member 10 is provided on a longitudinal part 6 (FIG. 2) of the lamp vessel 1, which is a non-deformed part of a tube having an outer diameter of about 4 mm, in which a seal 7 of the lamp vessel 1 onto a current supply conductor 4 is realized. The part 6 is situated on the side of the seal 7 remote from the electric element 3.

Figure 4:
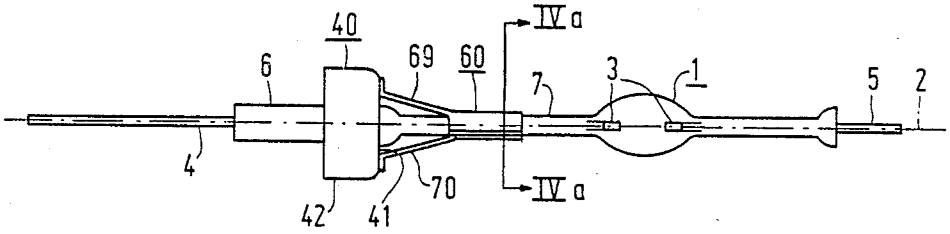
FIG. 4 is a side elevation of another intermediate product of an embodiment of the lamp.

In FIG. 4, the same reference numerals are used for parts identical with parts of FIG. 2.

Figure 4A:
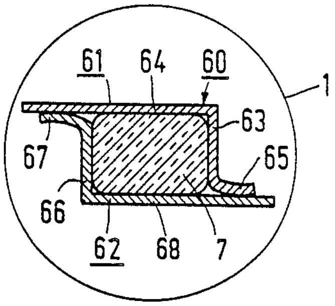
FIG. 4*a* is a cross-section taken on the line IV*a*—IV*a* of FIG. 4.

A metal clamping member 60 surrounds a longitudinal part of the seal 7 of the lamp vessel 1 with clamping fit. The metal clamping member 60 is a muff consisting of two parts 61 and 62 having a Z-shaped cross-section (FIG. 4*a*). The part 61 has a central surface 63 and at right angles thereto two end surfaces 64 and 65. The part 62 has a central surface 66 and at right angles thereto two end surfaces 67 and 68. The central surfaces 63 and 66 are located opposite to each other. The end surfaces 64 and 67 and 65 and 68, respectively, engage each other pairwise over at least a part of their surface area and are secured to each other in situ by welding. The muff 60 is secured by means of metal strips 69 and 70 to the metal bushing 40 (see also FIGS. 1 and 3). In the embodiment shown, the strip 69 is integral with the end surface 64 of the muff part 61, while the strip 70 is integral with the end surface 68 of the muff part 62. The base part 41 of the metal bushing 40 is directed towards the electric element 3. The metal strips 69 and 70 are welded to the outer side of the base part 41. The metal bushing 40 cooperates telescopically with the metal sleeve 30 (FIG. 1) and is secured thereto by welding on the longitudinal tongues 31 thereof.

As shown in FIG. 4*a*, both the central surfaces 63 and 66 and the end surfaces 64 and 68 constituting together the boundary walls of the muff 60 are in contact with the seal 7. When mounting the muff 60, first the central surfaces 63 and 66 are pressed towards each other so that the seal 7 is enclosed between said central surfaces. Subsequently, the end surfaces 64 and 68 are pressed towards each other and are welded to the end surfaces 67 and 65, respectively. By choosing the width (the height in FIG. 4*a*) of the central surfaces 63 and 66 slightly smaller than the thickness (in FIG. 4*a* the height) of the seal 7, gaps subsist between end surfaces 64 and 67 and 68 and 65, respectively, when pressing the end surfaces 64 and 68 towards each other. The end surfaces 64 and 67 and 68 and 65, respectively, must now be locally pulled against each other in order that they can be welded to each other. Thus, a satisfactory clamping of the seal 7 between the end surfaces 64 and 68 is also obtained. The result is that the seal 7 is displaceable neither in the direction of the central surfaces 63 and 66 nor in the direction of the end surfaces 64 and 68 nor in the axial direction within the muff.

Figure 5:
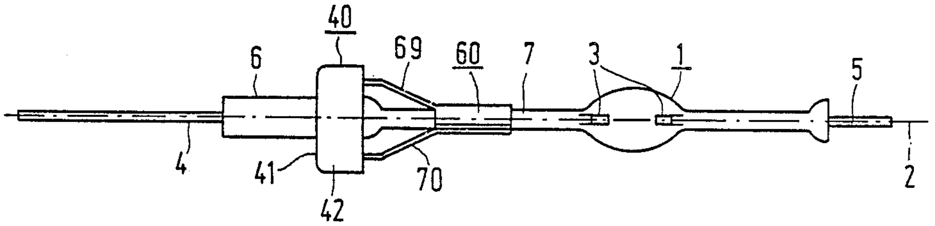
FIG. 5 shows a variation of FIG. 4.

In FIG. 5, the same reference numerals are used for parts corresponding to parts in FIG. 4. In the embodiment shown, the base part 41 of the metal bushing 40 is remote from the electric element 3. The muff 60 is secured in this case by means of the metal strips 69 and 70 to the inner side of the circular-cylindrical part 42 of the metal bushing 40. The constructions of FIGS. 4 and 5 are otherwise identical.

In FIG. 1, the lamp has a dimming hood 50 surrounding the lamp vessel 1 laterally over part of its circumference. The dimming hood 50 has at one end a cylindrical part 51, which is provided with longitudinal metal tongues 52 arranged in spaced relationship. The tongues 52 are secured to the metal bushing 40, for example by welding. In the Figure, the dimming hood is made in one piece. After the metal bushing 40 had been secured to the clamping member 10, the dimming hood 50 can be secured in the aligned state with respect to the lamp vessel 1 to the metal bushing 40. The current supply conductor 5 is secured, in FIG. 1 via a tongue 53, to the dimming hood 50. The dimming hood 50 is consequently current-conveying during operation.

Figure 6:
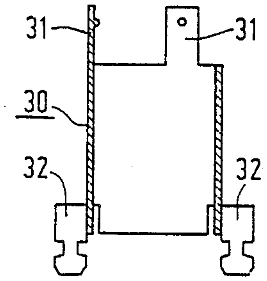
FIG. 6 is a longitudinal sectional view of the metal sleeve of the lamp of FIG. 1.
Figure 7:
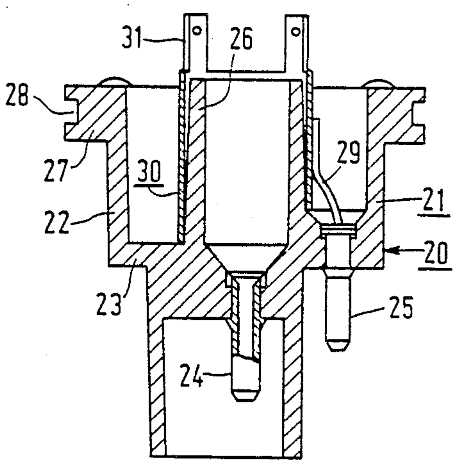
FIG. 7 is a longitudinal sectional view of the lamp cap of the lamp of FIG. 1.

Reference is made to FIGS. 6 and 7. The metal sleeve 30 has in the embodiment shown at one end radially extending vanes 32, which are passed through openings in the base portion 23 of the lamp cap 20 and are twisted to fix the sleeve 30 in the cup-shaped part 21 (FIG. 1). These openings can then be sealed. In FIG. 7, the contact element 25 is connected electrically through a conductor 29 to the sleeve 30 and is thus connected through the metal bushing 40 and the dimming hood 50 to the current-supply conductor 5 (FIG. 1). The lamp cap 20 has within the cup-shaped part 21 a tubular part 26, which is arranged on the base portion 23 and through which a current supply conductor 4 (FIG. 1) extends to a contact member 24. The part 26 isolates said current-supply conductor 4 from the sleeve 30. Near the open end of the cup-shaped part 21, the lamp cap 20 has a protruding collar 27 provided with a tangential groove for a sealing ring. The collar 27 is adapted to abut against the boundary of an opening in a reflector in order to position the lamp accurately with its electric element 3 in said reflector.

What is claimed is:

1. A capped electric lamp comprising
a translucent lamp vessel sealed in a vacuum-tight manner, filled with gas and having a longitudinal axis,
an electric element arranged in the lamp vessel,
current-supply conductors extending from the electric element through the lamp vessel to the exterior,
a metal clamping member for surrounding with a clamping fit a longitudinal part of the lamp vessel,
a lamp cap of insulating material having a cup-shaped part with a continuous wall portion and a base portion, and contact members projecting beyond the cup-shaped part,
a substantially circular-cylindrical metal sleeve, said sleeve being fixed in the cup-shaped part of the lamp cap and having an end projecting beyond said cup-shaped part in the axial direction opposite said contact members, the current-supply conductors being connected to a respective contact member of the lamp cap, wherein the improvement comprises:
a metal bushing for cooperating telescopically with said metal sleeve in said lamp cap, said metal bushing having a base part and a substantially circular-cylindrical part, said base part having an opening into which the lamp vessel is passed,
said metal clamping member being secured to said metal bushing,
and said metal bushing being secured to said metal sleeve.

2. A capped electric lamp as claimed in claim 1, wherein the metal clamping member is a tube having a protruding collar, said tube having a longitudinal gap merging into a radial gap in the collar, the protruding collar being secured to the base part of the metal bushing.

3. A capped electric lamp as claimed in claim 2, wherein the tube of the clamping member is located within the metal bushing and the collar of the clamping member is secured on the outer side of the metal bushing.

4. A capped electric lamp as claimed in claim 1, wherein the metal clamping member is a muff consisting of two parts of Z-shaped cross-section each having a central surface and two end surfaces substantially at right angles to said central surface, the central surfaces of said parts being arranged opposite to each other and the end surfaces of said parts engaging each other pairwise over at least part of their surface area and being secured to each other in situ.

5. A capped electric lamp as claimed in claim 4, wherein the central surfaces and the end surfaces of the Z-shaped muff parts limiting the space within the muff are in contact with the longitudinal part of the lamp vessel.

6. A capped electric lamp as claimed in claim 5, wherein the muff is secured to the metal bushing by means of metal strips which are integral with the muff.

7. A capped electric lamp as claimed in claim 6, wherein the lamp has a dimming hood provided at one end with a cylindrical part having longitudinal metal tongues arranged in spaced relationship, which tongues are secured to the metal bushing.

8. A capped electric lamp as claimed in claim 7, wherein a current supply conductor of the lamp is electrically connected to the dimming hood and the dimming hood is current-conveying during operation.

9. A capped electric lamp as claimed in claim 8, wherein a contact member of the lamp cap is electrically connected to the metal sleeve of the lamp cap.

10. A capped electric lamp as claimed in claim 7, wherein the lamp cap has within the cup-shaped part a tubular part, which is arranged on the base portion and through which a current supply conductor extends to a contact member of the lamp cap.

11. A capped electric lamp as claimed in claim 10, wherein the lamp cap has a protruding collar near the end of the cup-shaped part of the lamp cap closest to said lamp vessel.

12. A capped electric lamp as claimed in claim 4, wherein the muff is secured to the metal bushing by means of metal strips which are integral with the muff.

13. A capped electric lamp as claimed in claim 5, wherein the lamp has a dimming hood provided at one end with a cylindrical part having longitudinal metal tongues arranged in spaced relationship, which tongues are secured to the metal bushing.

14. A capped electric lamp as claimed in claim 1, wherein the lamp has a dimming hood provided at one end with a cylindrical part having longitudinal metal tongues arranged in spaced relationship, which tongues are secured to the metal bushing.

15. A capped electric lamp as claimed in claim 6, wherein the lamp cap has within the cup-shaped part a tubular part, which is arranged on the base portion and through which a current supply conductor extends to a contact member of the lamp cap.

16. A capped electric lamp as claimed in claim 5, wherein the lamp cap has within the cup-shaped part a tubular part, which is arranged on the base portion and through which a current supply conductor extends to a contact member of the lamp cap.

17. A capped electric lamp as claimed in claim 1, wherein the lamp cap has within the cup-shaped part a tubular part, which is arranged on the base portion and through which a current supply conductor extends to a contact member of the lamp cap.

18. A capped electric lamp as claimed in claim 15, wherein the lamp cap has a protruding collar near the end of the cup-shaped part of the lamp cap closest to said lamp vessel.

19. A capped electric lamp as claimed in claim 7, wherein the lamp cap has a protruding collar near the end of the cup-shaped part of the lamp cap closest to said lamp vessel.

20. A capped electric lamp as claimed in claim 1, wherein the lamp cap has a protruding collar near the end of the cup-shaped part of the lamp cap closest to said lamp vessel.

* * * * *